(12) United States Patent
Lane et al.

(10) Patent No.: US 6,969,171 B2
(45) Date of Patent: Nov. 29, 2005

(54) LIGHT-BLOCKING AIR VENTS FOR EYEWEAR

(75) Inventors: Henry Welling Lane, San Luis Obispo, CA (US); Eric Rhea, San Luis Obispo, CA (US)

(73) Assignee: Dioptics Medical Products, Inc., San Luis Obispo, CA (US)

( * ) Notice: Subject to any disclaimer, the term of this patent is extended or adjusted under 35 U.S.C. 154(b) by 0 days.

(21) Appl. No.: 10/607,068

(22) Filed: Jun. 25, 2003

(65) Prior Publication Data

US 2004/0263773 A1   Dec. 30, 2004

(51) Int. Cl.$^7$ .............................................. G02C 11/08
(52) U.S. Cl. .......................................... 351/62; 2/435
(58) Field of Search .............................. 351/41, 62, 91, 351/44; 2/435–437

(56) References Cited

U.S. PATENT DOCUMENTS

| | | | |
|---|---|---|---|
| 163,648 A * | 5/1875 | Gall ............................. | 351/62 |
| 513,603 A | 1/1894 | Tileston | |
| 604,238 A | 5/1898 | Nerney | |
| 1,843,847 A | 2/1932 | Sutton | |
| 2,300,365 A | 10/1942 | Wagner | |
| 2,407,518 A | 9/1946 | Schauweker | |
| 2,545,428 A | 3/1951 | Liautaud | |
| 2,608,687 A * | 9/1952 | Ellis .............................. | 2/445 |
| 2,654,090 A | 10/1953 | Christensen et al. | |
| 3,160,735 A * | 12/1964 | Aufricht ........................ | 2/435 |
| 3,377,626 A | 4/1968 | Smith | |
| 3,395,406 A | 8/1968 | Smith | |
| 4,150,443 A | 4/1979 | McNeilly | |
| 4,217,037 A | 8/1980 | Lemelson | |
| 4,571,748 A | 2/1986 | Carroll et al. | |
| 4,670,914 A | 6/1987 | Harris | |
| 4,707,863 A | 11/1987 | McNeal | |
| 4,726,075 A | 2/1988 | Hinrichs | |
| 4,877,320 A | 10/1989 | Holden | |
| 4,976,530 A | 12/1990 | Mackay et al. | |
| 5,135,298 A | 8/1992 | Feltman | |
| 5,138,714 A | 8/1992 | Smith | |
| 5,146,623 A | 9/1992 | Paysan et al. | |
| 5,218,385 A | 6/1993 | Lii | |
| 5,220,689 A | 6/1993 | Miller | |
| D339,596 S | 9/1993 | Kopfer | |
| 5,245,709 A | 9/1993 | Shipcott | |
| 5,300,963 A | 4/1994 | Tanaka | |
| 5,319,396 A | 6/1994 | Cesarczyk | |

(Continued)

FOREIGN PATENT DOCUMENTS

AU         124450 S        8/1995

(Continued)

Primary Examiner—Huy Mai
(74) Attorney, Agent, or Firm—Derek J. Westberg

(57) ABSTRACT

The invention provides light-blocking air vents for eyewear. A frame for the eyewear has a brow web that extends approximately horizontally from a top portion of the frame. The brow web includes at least one ventilation aperture having a internal side that is substantially sloped with respect to a top surface of the brow web. One or more lenses are mounted to the frame. Air is allowed to pass through the aperture. However, by providing that the internal side of the aperture is substantially sloped, light is blocked from entering through the aperture. The brow web may include a plurality of ventilation apertures for each of two lenses mounted to the frame. The apertures for each lens are arranged substantially equally-spaced in a row. A lower web may also be provided that includes one or more ventilation apertures. Side lenses may also be provided along with apertures for ventilating the side lenses.

45 Claims, 5 Drawing Sheets

U.S. PATENT DOCUMENTS

| | | | |
|---|---|---|---|
| 5,357,292 A | 10/1994 | Wiedner | |
| 5,379,464 A | 1/1995 | Schleger et al. | |
| 5,388,269 A | 2/1995 | Griffin | |
| 5,394,567 A | 3/1995 | Vatterott | |
| 5,402,189 A | 3/1995 | Gill | |
| 5,416,536 A | 5/1995 | Tee, Jr. | |
| 5,423,092 A | 6/1995 | Kawai | |
| 5,438,706 A | 8/1995 | Lambur | |
| 5,463,428 A | 10/1995 | Lipton et al. | |
| 5,483,303 A | 1/1996 | Hirschman | |
| 5,502,515 A | 3/1996 | Sansalone | |
| 5,530,490 A | 6/1996 | Canavan | |
| 5,638,145 A | 6/1997 | Jannard et al. | |
| D383,772 S | 9/1997 | Atabeyki | |
| D387,083 S | 12/1997 | Stables | |
| 5,711,035 A * | 1/1998 | Haslbeck | 2/436 |
| 5,760,868 A | 6/1998 | Jannard et al. | |
| D396,484 S | 7/1998 | Stables | |
| D398,021 S | 9/1998 | Bollé | |
| D401,610 S | 11/1998 | Flanagan | |
| D403,690 S | 1/1999 | Arnette | |
| D407,566 S | 4/1999 | Lane | |
| D408,840 S | 4/1999 | Lane | |
| 5,969,786 A | 10/1999 | Marcum | |
| 5,969,787 A * | 10/1999 | Hall et al. | 351/62 |
| D416,933 S | 11/1999 | Lane | |
| D417,461 S | 12/1999 | Lane | |
| D418,534 S | 1/2000 | Lane | |
| D419,585 S | 1/2000 | Lane | |
| 6,009,564 A | 1/2000 | Tackles et al. | |
| D421,763 S | 3/2000 | Pickering et al. | |
| D433,051 S | 10/2000 | Bolle et al. | |
| D433,698 S | 11/2000 | Lane | |
| D434,062 S | 11/2000 | Lane | |
| D434,063 S | 11/2000 | Lane | |
| D434,789 S | 12/2000 | Lane | |
| D439,597 S | 3/2001 | Marcum | |
| D448,399 S | 9/2001 | Lane | |
| 6,343,860 B1 | 2/2002 | Pierotti | |
| 6,450,639 B1 * | 9/2002 | Abraham | 351/62 |
| 6,530,659 B1 | 3/2003 | Marcum | |
| 6,550,914 B1 | 4/2003 | Kopfer | |
| 6,641,263 B2 | 11/2003 | Olney | |
| 6,793,336 B2 | 9/2004 | Min | |
| 2004/0017540 A1 * | 1/2004 | Matera | 351/91 |

FOREIGN PATENT DOCUMENTS

| | | |
|---|---|---|
| AU | 127863 S | 9/1996 |
| FR | 1185637 | 8/1959 |

* cited by examiner

LIGHT-BLOCKING AIR VENTS FOR EYEWEAR

FIELD OF THE INVENTION

The invention relates to the field of eyewear and, more particularly, to eyewear having air vents.

BACKGROUND OF THE INVENTION

Eyewear is often designed to fit closely to the wearer's face so as to block light, wind, water or dust from entering the area behind the lens or lenses. This also tends to trap moisture, which can result in fogging of the lens or lenses. The tendency for fogging can be reduced by the provision of vents which allow moist air to escape the area behind the lens or lenses.

A number of venting techniques have been employed for eyewear. For example, U.S. Pat. No. 6,233,342 discloses eyewear for use in sports and the like which allows the user to adjust the flow of air across the inside surface of the lens without having to remove the eyewear. Ventilation apertures are preferred to be covered with permeable foam to prevent the ingress of dust and particulate matter through the apertures. A sliding block provides control over airflow. This eyewear has a drawback in that moving parts are required to control airflow and the foam for covering the ventilation apertures contribute to increased complexity of the eyewear and, thus, cost of manufacture.

U.S. Pat. No. 5,969,787 discloses eyewear with browbar ventilation and detachable temples. A browbar frame is detachably secured to a lens and temples are detachably secured to the browbar frame. The browbar frame includes numerous openings to allow air to pass through the browbar frame for preventing fogging of the lens. This eyewear has a disadvantage that light is not inhibited from entering behind the lens area through the ventilation openings.

U.S. Pat. No. 5,760,868 discloses eyewear having a ventilated frame including air inlets on lateral sides of the frame. This eyewear also has a disadvantage in that light is not inhibited from entering behind the lens area through the air inlets.

Therefore, what is needed is an improved technique for eyewear ventilation which is not excessively complex to manufacture and that inhibits light from entering behind the lens area of the eyewear or into the wearer's eye.

SUMMARY OF THE INVENTION

The invention provides light-blocking air vents for eyewear. In one embodiment, a frame for the eyewear has a brow web that extends approximately horizontally from a top portion of the frame. The brow web includes at least one ventilation aperture having an internal side that is substantially sloped with respect to a top surface of the brow web. One or more lenses are mounted to the frame. Air is allowed to pass through the aperture. However, by providing that the internal side of the aperture is substantially sloped, light is blocked from entering through the aperture. A lower web may also be provided that may include one or more ventilation apertures so as to provide cross-ventilation for the lenses. Side lenses may also be provided to increase the wearer's peripheral vision. Ventilation apertures may be provided for ventilating the side lenses.

In another embodiment, the brow web includes a plurality of ventilation apertures for each of two lenses mounted to the frame. The apertures for each lens are arranged substantially equally-spaced in a row and wherein each aperture has parallel sides and a center axis that is substantially sloped with respect to a top surface of the brow web. The brow web and frame may be molded as a single body.

In yet another embodiment, a frame for the eyewear includes at least one ventilation aperture having an internal side that is substantially perpendicular to a wearer's line of sight toward the ventilation aperture. Thus, the ventilation apertures can be positioned at various locations on the frame, including the brow bar. However, by sloping the sides of the apertures with respect to the wearer's line of sight, light is blocked from entering the wearer's eye.

These and other aspects of the invention as described in more detail herein.

DETAILED DESCRIPTION OF A PREFERRED EMBODIMENT

Figure 1:
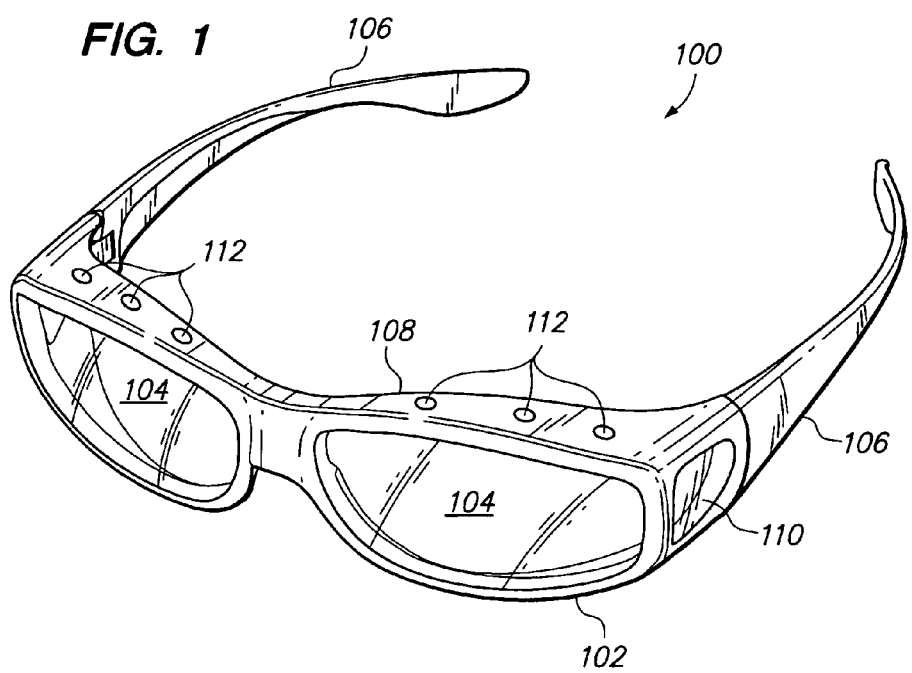
FIG. 1 illustrates a front perspective view of eyewear in accordance with an embodiment of the present invention.
Figure 2:
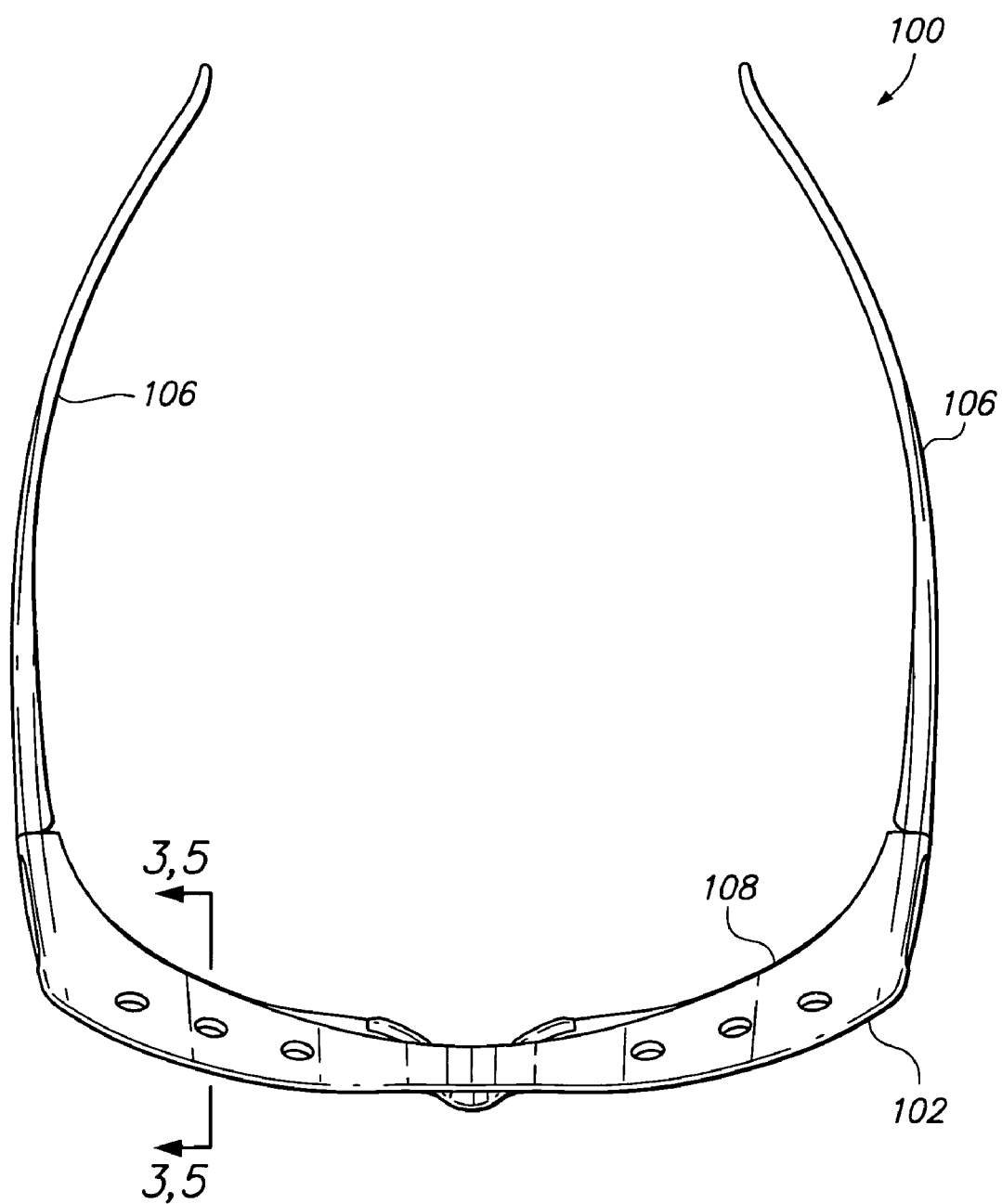
FIG. 2 illustrates a top view of eyewear in accordance with an embodiment of the present invention.

Referring to FIG. 1, a perspective view of eyewear 100 is shown in accordance with an embodiment of the present invention. FIG. 2 illustrates a top view of the eyewear 100. The eyewear 100 includes a frame 102, lenses 104 and earpieces 106. In a preferred embodiment, two lenses 104 are provided, though it will be apparent that the two lenses can be replaced with a single lens. Also one or more additional lenses (e.g., side lenses) may be provided.

The frame 102 preferably includes a brow web 108 that extends from a top portion of the frame 102. The top surface of the brow web 108 is substantially horizontal while the eyewear 100 is being worn. The brow web 108 inhibits light from entering the area behind the lenses 104 and into wearer's eyes by occupying a gap that would otherwise be present between the top portion of the frame 102 and the wearer's face. Thus, to block a maximum amount of light, the brow web 108 preferably has a curved edge that substantially conforms to the brow area or forehead of the wearer's face.

The front lenses 104 are preferably tinted. In addition, side lenses 110 may also be provided in the frame 102 which are also tinted so as to provide increased peripheral vision while shielding the wearer's eyes from light which might otherwise enter at the sides of the frame 102. The eyewear 100 may be worn by itself, without any other eyewear, or may be worn with other eyewear. For example, the eyewear 100 may be worn over conventional eyeglasses having vision-corrective lenses.

The frame 102 includes at least one ventilation aperture 112, though a plurality of ventilation apertures 112 is preferably provided. In a preferred embodiment, the ventilation apertures 112 are provided in the brow web 108 so as to allow moist air, which might otherwise be trapped by the brow web 108, to exit from behind the lenses. In addition, a plurality of apertures 112 may be provided for each of the two lenses 104, where the apertures 112 for each lens 104 are arranged substantially equally-spaced in a row that approximately follows the curvature of the lens 104. A preferred number is three apertures above each lens 104 for a total of six apertures 112 in the brow web 108. This is shown in FIGS. 1 and 2.

As is also shown in FIGS. 1 and 2, the apertures 112 may be substantially oval, though in other embodiments, the apertures may be substantially round, polygonal or of another shape.

Figure 3:
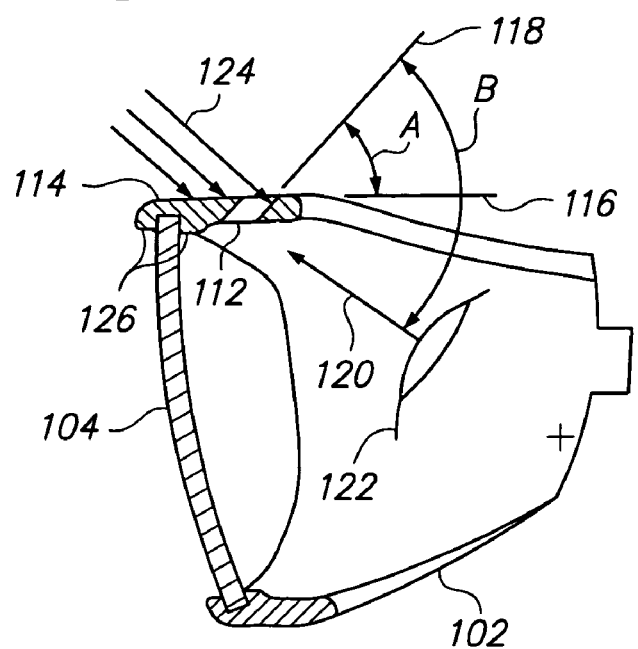
FIG. 3 illustrates a side-sectional view of eyewear in accordance with an embodiment of the present invention.

FIG. 3 illustrates a side-sectional view of the frame 102 for the eyewear 100 in accordance with an embodiment of the present invention. The section of FIG. 3 is taken through the broken line shown in FIG. 2. As shown in FIG. 3, the apertures 112 have at least one internal side that is substantially sloped with respect to a top surface 114 of the brow web 108. More particularly, line 116 in FIG. 3 is parallel to the top surface 114 of the brow web 108, while line 118 is parallel to a rear-most side of the aperture 112. The lines 116 and 118 are separated by a substantial angle A, with the line 118 being sloped upward in the direction of the wearer and with the inside opening of the aperture 112 being pointed toward the lens 104. In a preferred embodiment, the angle A is approximately forty-five degrees though the angle A may be greater or less than forty-five degrees.

The internal side of the aperture 112 is preferably substantially perpendicular to a line of sight 120 of the wearer when the wearer is looking toward the ventilation apertures 112. This is shown by the wearer's eye 122 being angled upward in FIG. 3. Thus, the line 118 is substantially perpendicular to the line of sight 120 so that an angle B is approximately ninety degrees, though the angle B can be greater or less than ninety degrees. In other words, the internal side of the aperture 112 is substantially parallel to the circumference of the user's eye. By providing that the internal side of the aperture is substantially sloped, light 124 is blocked from entering the wearer's eye through the aperture 112. It is expected that light having a source behind the wearer will be substantially blocked from passing through that the apertures 112 by the wearer (i.e. the apertures 112 will be in the wearer's shadow).

In a preferred embodiment, the apertures 112 have parallel sides, as shown in FIG. 3, though the apertures 112 may have tapered sides (e.g., forming a conical shape). In addition, limiting the width of the apertures 112 to be substantially equal to or less than the thickness of the material through which each extends (e.g., the brow web 108), also inhibits light 124 from entering the wearer's eye 122. Otherwise, if an aperture 112 is too wide with respect to the thickness of the brow web 108, light may enter despite the sloping side of the apertures 112. Thus, where the width of the apertures 112 is approximately equal to the material thickness, an approximately forty-five degree angle, as discussed above, is preferred. However, where the material is thicker, a greater angle can be used and, where the material is thinner, a smaller angle may be necessary.

To maximize removal of moist air, the apertures 112 are preferably positioned as close to the lens 104 as is practical. However, the lenses 104 may be mounted in channel 126 formed in the frame 102. More particularly, the channel 126 is formed of a ring of material on either side of the lens 104 periphery. Accordingly, the apertures 112 are preferably positioned closely adjacent to the channel 126, but without invading the channel 126, so as to avoid compromising its structural strength.

Figure 4:
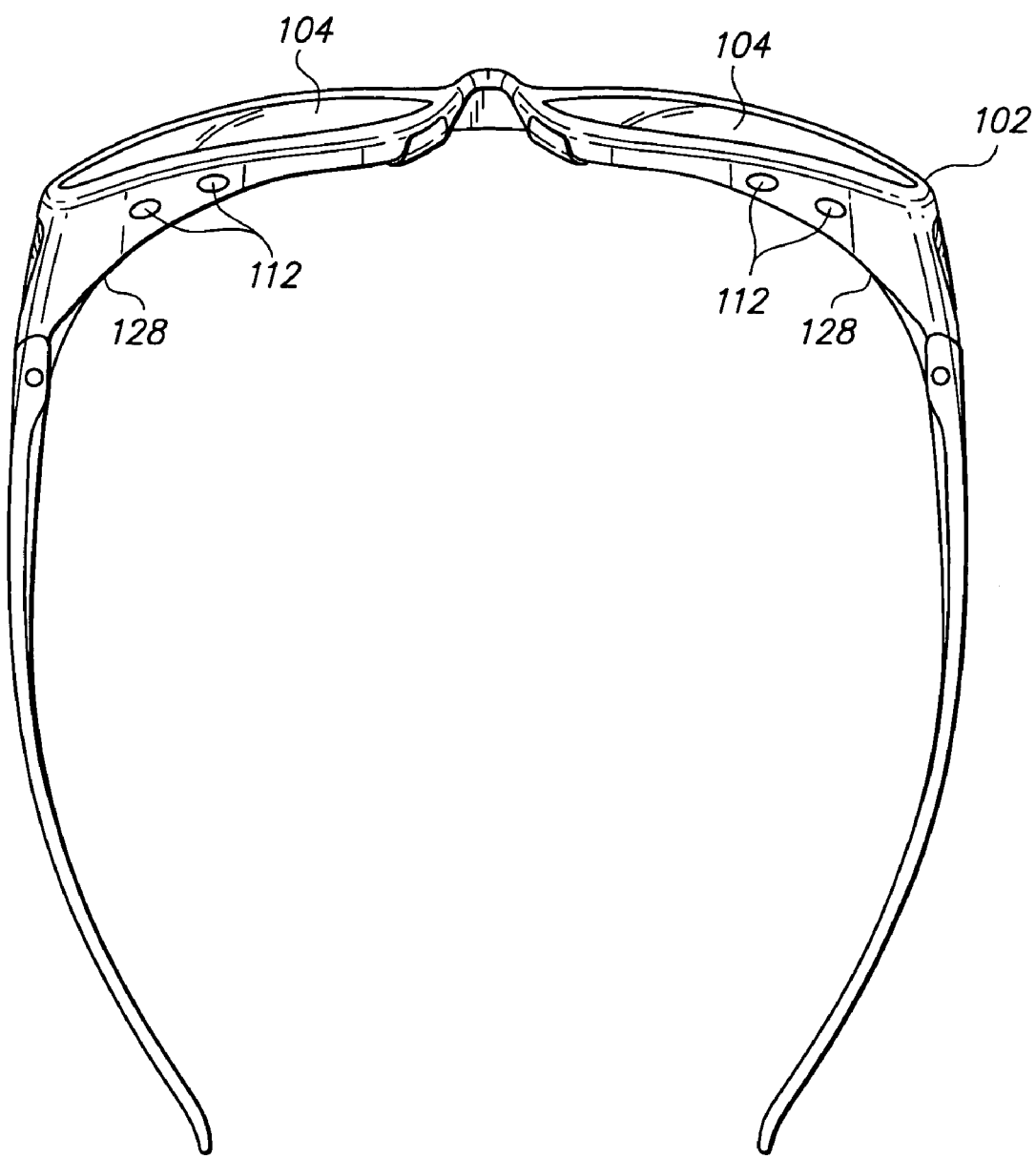
FIG. 4 illustrates a bottom view of eyewear in accordance with an embodiment of the present invention.

FIG. 4 shows a bottom view of eyewear in accordance with an embodiment of the present invention. As shown in FIG. 4, the frame 102 may optionally include lower webs 128. The lower webs 128 are positioned beneath each of the front lenses 104 and inhibit light from entering the area behind the lenses 104 and into wearer's eyes by occupying a gap that would otherwise be present between the lower portion of the frame 102 and the wearer's face. Thus, to block a maximum amount of light, the lower webs 128 preferably each have a curved edge that substantially conforms to the area of the wearer's face beneath the eyes.

Thus, in another embodiment, one more ventilation apertures 112 may be provided in locations other than, or in addition to, those the brow web 108. For example, one or more ventilation apertures 112 may be provided in the lower webs 128. As shown in FIG. 4, in a preferred embodiment, two ventilation apertures 112 arranged substantially in a row are provided in the lower web 128 beneath each of the front lenses. These apertures 112 allow moist air, which might otherwise be trapped to exit from behind the lenses. Taken in combination with the apertures in the brow web 108 (FIGS. 1 and 2), these apertures 112 provide for cross-ventilation of the lenses 104 for improved reduction of lens fogging. More particularly, air is allowed to flow into the space behind the front lenses 104 (e.g., through the apertures 112 in the lower web 128), across the lenses 104 and out of the space behind the lenses 104 (e.g., through the apertures 112 in the brow web 108).

Figure 5:
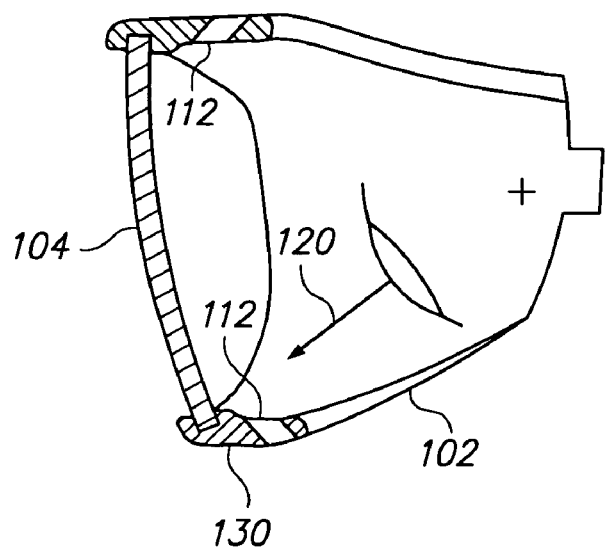
FIG. 5 illustrates a side-sectional view of eyewear in accordance with an embodiment of the present invention.

FIG. 5 shows a side-sectional view of eyewear in accordance with an embodiment of the present invention having ventilation apertures 112 in the lower web 128. The section of FIG. 5 is taken through the broken line shown in FIG. 2. As shown in FIG. 5, the apertures 112 in the lower web 128 preferably have at least one internal side that is substantially sloped with respect to a bottom surface 130 of the lower web 128. In a preferred embodiment, the angle is approximately forty-five degrees, though the angle may be greater or less than forty-five degrees. For the apertures 112 beneath the lenses 104, the slope is preferably in the opposite direction than the apertures 112 above the lenses 104. Thus, the internal side of the aperture 112 is sloped downward in the direction of the wearer and with the inside opening of the aperture 112 being pointed toward the lens 104. Also, the internal side of the aperture 112 is preferably substantially perpendicular to a line of sight 120 of the wearer when the wearer is looking toward the ventilation apertures 112. This is shown by the wearer's eye 122 being angled downward in FIG. 5.

Figure 6:
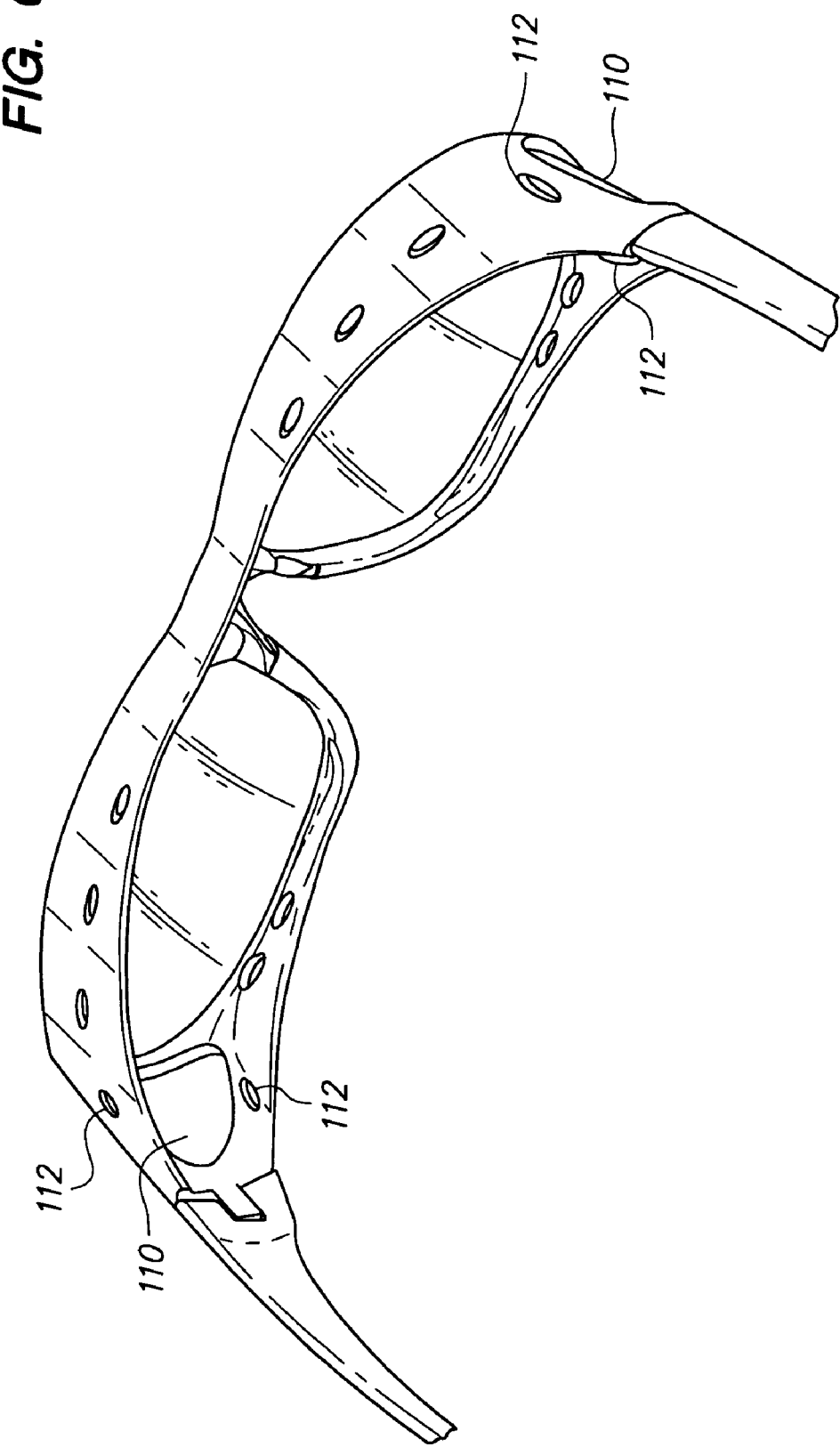
FIG. 6 illustrates a rear perspective view of eyewear in accordance with an embodiment of the present invention.

FIG. 6 illustrates a rear perspective view of eyewear in accordance with an embodiment of the present invention including ventilation apertures in proximity to the sides lenses 110. As shown in FIG. 6, ventilation apertures 112 are provided for each of the side lenses 110, include one aperture 112 above each of the two side lenses 110 and one aperture beneath each of the side lenses 110. Preferably, these apertures 112 also have an internal side that is sloped, such that light entering the aperture 112 is directed away from the wearer's eye. Thus, the sides and internal opening of these apertures 112 are preferably pointed toward the side lens 110. By providing one or more apertures above and below each side lens 110, cross-ventilation of air may be allowed for each of the side lenses 110. In another embodiment, the present invention includes a method of manufacture of eyewear 100 having ventilation apertures 112. Preferably, the brow web 108 and frame 102 are molded as a single body (e.g., of plastic, nylon, metal, etc.) with the earpieces 106 being movably attached to the frame 102 by hinges. Thus, the method includes molding the frame 102 and, preferably the brow web 108, as a single body. A mold used in the manufacture preferably includes a number of bosses in the shape of the ventilation apertures 112 so that the ventilation apertures 112 are formed at the same time as the frame 102. The one or more lenses 104 and the earpieces 106 may then be attached to the molded frame 102.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. Eyewear comprising:
   a frame having a brow web extending approximately horizontally from a top portion of the frame, the brow web including at least one ventilation aperture having an internal side that is substantially sloped with respect to a top surface of the brow web; and
   one or more lenses mounted to the frame.

2. The eyewear according to claim 1, wherein the ventilation aperture is substantially round.

3. The eyewear according to claim 1, wherein the ventilation aperture is substantially oval.

4. The eyewear according to claim 1, wherein the ventilation aperture is substantially polygonal.

5. The eyewear according to claim 1, wherein the ventilation aperture has parallel sides.

6. The eyewear according to claim 1, wherein the internal side forms an angle of approximately forty-five degrees with respect to a surface of the brow web.

7. The eyewear according to claim 1, wherein the frame includes a lens channel and the aperture is closely adjacent to the lens channel.

8. The eyewear according to claim 1, comprising a plurality of apertures arranged substantially in a row.

9. The eyewear according to claim 8, wherein the row approximately follows a curvature of the lens.

10. The eyewear according to claim 1, comprising a plurality of apertures for each of two lenses wherein the apertures for each lens are arranged substantially equally-spaced in a row.

11. The eyewear according to claim 10, comprising three apertures for each of the two lenses.

12. The eyewear according to claim 1, wherein a width of the aperture is substantially equal to a thickness of the brow web.

13. The eyewear according to claim 1, wherein the brow web and frame are molded as a single body.

14. The eyewear according to claim 1, wherein the frame includes a lower web for each lens wherein the lower web extends from a lower portion of the frame at each lens and further comprising one or more ventilation apertures in each lower web.

15. The eyewear according to claim 14, wherein the ventilation aperture for each lower web includes an internal side that is substantially sloped with respect to a bottom surface of the lower web.

16. The eyewear according to claim 1, wherein the frame includes side lenses and further comprising at least one ventilation aperture in the brow web for ventilating the corresponding side lens.

17. The eyewear according to claim 16, wherein the frame includes a lower web for each lens wherein the lower web extends from a lower portion of the frame at each lens and further comprising one or more ventilation apertures in each lower web.

18. The eyewear according to claim 17, the ventilation aperture for each lower web includes an internal side that is substantially sloped with respect to a bottom surface of the lower web.

19. Eyewear comprising a frame having a brow web extending approximately horizontally from a top portion of the frame, the brow web comprising a plurality of ventilation apertures for each of two lenses mounted to the frame wherein the apertures for each lens are arranged substantially equally-spaced in a row and wherein each aperture has parallel sides and a center axis that is substantially sloped with respect to a top surface of the brow web.

20. The eyewear according to claim 19, wherein the ventilation apertures are substantially round.

21. The eyewear according to claim 19, wherein the ventilation apertures are substantially oval.

22. The eyewear according to claim 19, wherein the ventilation apertures are substantially polygonal.

23. The eyewear according to claim 19, wherein the internal side forms an angle of approximately forty-five degrees with respect to a surface of the brow web.

24. The eyewear according to claim 19, wherein a width of the aperture is substantially equal to a thickness of the brow web.

25. The eyewear according to claim 19, wherein the brow web and frame are molded as a single body.

26. The eyewear according to claim 19, wherein the frame includes a lower web for each lens wherein the lower web extends from a lower portion of the frame at each lens and further comprising one or more ventilation apertures in each lower web.

27. The eyewear according to claim 26, wherein the ventilation aperture for each lower web includes an internal side that is substantially sloped with respect to a bottom surface of the lower web.

28. The eyewear according to claim 19, wherein the frame includes side lenses and further comprising at least one ventilation aperture in the brow web for ventilating the corresponding side lens.

29. The eyewear according to claim 28, wherein the frame includes a lower web for each lens wherein the lower web extends from a lower portion of the frame at each lens and further comprising one or more ventilation apertures in each lower web.

30. The eyewear according to claim 29, the ventilation aperture for each lower web includes an internal side that is substantially sloped with respect to a bottom surface of the lower web.

31. A method of manufacture of eyewear comprising:
   molding a frame as a single body having a brow web extending approximately horizontally from a top portion of the frame and including molding a plurality of ventilation apertures in the brow web and wherein each aperture has parallel sides and a center axis that is substantially sloped with respect to a top surface of the brow web;
   attaching one or more lenses to the frame; and
   attaching hinged earpieces to the frame.

32. The method according to claim 31, wherein the apertures for each lens are arranged substantially equally-spaced in a row for each of two lenses.

33. Eyewear comprising:
a frame including at least one ventilation aperture;
a brow web extending approximately horizontally from a top portion of the frame, wherein the ventilation aperture extends through the brow web, the brow web including a top surface that is substantially horizontal while being worn, an angle separating the top surface and an internal side of the aperture being approximately forty-five degrees or less; and
one or more lenses mounted to the frame.

34. The eyewear according to claim 33, wherein the angle is approximately forty-five degrees.

35. The eyewear according to claim 33, wherein the ventilation aperture is substantially round.

36. The eyewear according to claim 33, wherein the ventilation aperture is substantially oval.

37. The eyewear according to claim 33, wherein the ventilation aperture is substantially polygonal.

38. The eyewear according to claim 33, wherein opposite sides of the ventilation aperture are parallel.

39. The eyewear according to claim 33, wherein the frame includes a lens channel and the aperture is closely adjacent to the lens channel.

40. The eyewear according to claim 33, comprising a plurality of apertures arranged substantially in a row.

41. The eyewear according to claim 33, wherein the row approximately follows a curvature of the lens.

42. The eyewear according to claim 33, comprising a plurality of apertures for each of two lenses wherein the apertures for each lens are arranged substantially equally-spaced in a row.

43. The eyewear according to claim 42, comprising three apertures for each of the two lenses.

44. The eyewear according to claim 33, wherein a width of the aperture is substantially equal to a thickness of the brow web.

45. The eyewear according to claim 33, wherein the brow web and frame are molded as a single body.

* * * * *